(12) United States Patent
Wojak

(10) Patent No.: US 7,067,097 B1
(45) Date of Patent: Jun. 27, 2006

(54) PROCESS FOR PREPARING A DIAMOND SUBSTANCE

(76) Inventor: Gregory J. Wojak, 6890 N. 79th Pl., Scottsdale, AZ (US) 85250

(*) Notice: Subject to any disclaimer, the term of this patent is extended or adjusted under 35 U.S.C. 154(b) by 341 days.

(21) Appl. No.: 10/364,863

(22) Filed: Feb. 11, 2003

Related U.S. Application Data

(60) Provisional application No. 60/356,304, filed on Feb. 12, 2002.

(51) Int. Cl.
    *C01B 31/06* (2006.01)
(52) U.S. Cl. .................. 423/446; 427/249.8
(58) Field of Classification Search .......... 423/446; 427/249.8
    See application file for complete search history.

(56) References Cited

U.S. PATENT DOCUMENTS

| | | | |
|---|---|---|---|
| 5,075,096 A * | 12/1991 | Tanabe et al. | 423/446 |
| 5,135,730 A * | 8/1992 | Suzuki et al. | 423/446 |
| 5,215,788 A * | 6/1993 | Murayam et al. | 427/450 |

FOREIGN PATENT DOCUMENTS

| | | | |
|---|---|---|---|
| JP | 03199197 A * | 8/1991 | |
| JP | 04059697 A * | 2/1992 | |

* cited by examiner

*Primary Examiner*—Stuart L. Hendrickson
*Assistant Examiner*—Alvin Raetzsch
(74) *Attorney, Agent, or Firm*—Howard J. Greenwald

(57) ABSTRACT

A process for producing a diamond substance with a first inner nozzle and a second outer nozzle. In the first step of the process, a first mixture comprised of oxygen and a hydrocarbon gas is formed in the first inner nozzle; such hydrocarbon gas contains from about 1.01 to about 1.1 moles of carbon for each mole of oxygen present in such first mixture, and said first mixture contains at least about 10 volume percent of hydrocarbon gas. In the second step of the process, the first mixture is ignited to produce a flame core. In the third step of the process, a second mixture comprised of hydrogen and oxygen is formed in the outer nozzle; the second mixture is comprised of at least 2 moles of said hydrogen for each mole of said oxygen present in the second mixture; hydrogen gas and oxygen gas comprise at least about 20 molar volume percent of the second mixture; and the second mixture contains up to about 5 volume percent of hydrocarbon gas. In the fourth step of the process, the second mixture is ignited to produce a flame sheath. The flame sheath is disposed around the flame core so that the flame sheath completely surrounds said flame core and completely shields said flame core from the ambient atmosphere, thereby-producing a composite flame; and the composite claim is contacted with a substrate.

20 Claims, 13 Drawing Sheets

PROCESS FOR PREPARING A DIAMOND SUBSTANCE

CROSS-REFERENCE TO RELATED PATENT APPLICATION

Priority for this application is based upon applicant's provisional application 60/356,304, filed on Feb. 12, 2002.

FIELD OF THE INVENTION

A process for producing a diamond substance in which a composite flame comprised of a core of hydrocarbon and oxygen and sheath of hydrogen, oxygen, and water deposits diamond onto a substrate.

BACKGROUND OF THE INVENTION

It is known that one can form a diamond substance by creating a plasma state within a hydrocarbon gas mixture by the well-known "combustion torch system." Typically a hydrocarbon gas, such as methane, ethane, or acetylene, is reacted with oxygen to form a flame, and the flame products are then deposited onto a substrate.

One disadvantage of the combustion torch process is that an inhomogeneous product is formed, having substantially good quality near the center of the flame and poor quality at is periphery. It is an object of this invention to provide a process which produces a high quality diamond substance which is substantially more homogeneous than prior art processes.

SUMMARY OF THE INVENTION

In accordance with this invention, there is provided a process for producing a diamond substance with a first inner nozzle and a second outer nozzle. In the first step of the process, first a mixture comprised of oxygen and a hydrocarbon gas is formed in the first inner nozzle; such hydrocarbon gas contains from about 1.01 to about 1.1 moles of carbon for each mole of oxygen present in such first mixture, and said first mixture contains at least about 10 volume percent of hydrocarbon gas. In the second step of the process, the first mixture is ignited to produce a flame core. In the third step of the process, a second mixture comprised of hydrogen and oxygen is formed in the outer nozzle; the second mixture is comprised of at least 2 moles of said hydrogen for each oxygen 1 mole of said present in the second mixture; hydrogen gas and oxygen gas comprise at least about 20 molar volume percent of the second mixture; and the second mixture contains up to about 5 volume percent of hydrocarbon gas. In the fourth step of the process, the second mixture is ignited to produce a flame sheath. The flame sheath is disposed around the flame core so that the flame sheath completely surrounds said flame core and completely shields said flame core from the ambient atmosphere, thereby producing a composite flame; and the composite flame is contacted with a substrate.

BRIEF DESCRIPTION OF THE DRAWINGS

The invention will be described by reference to the specification and the enclosed drawings, in which like elements are identified by like numerals, and in which.

DESCRIPTION OF THE PREFERRED EMBODIMENTS

Figure 1:
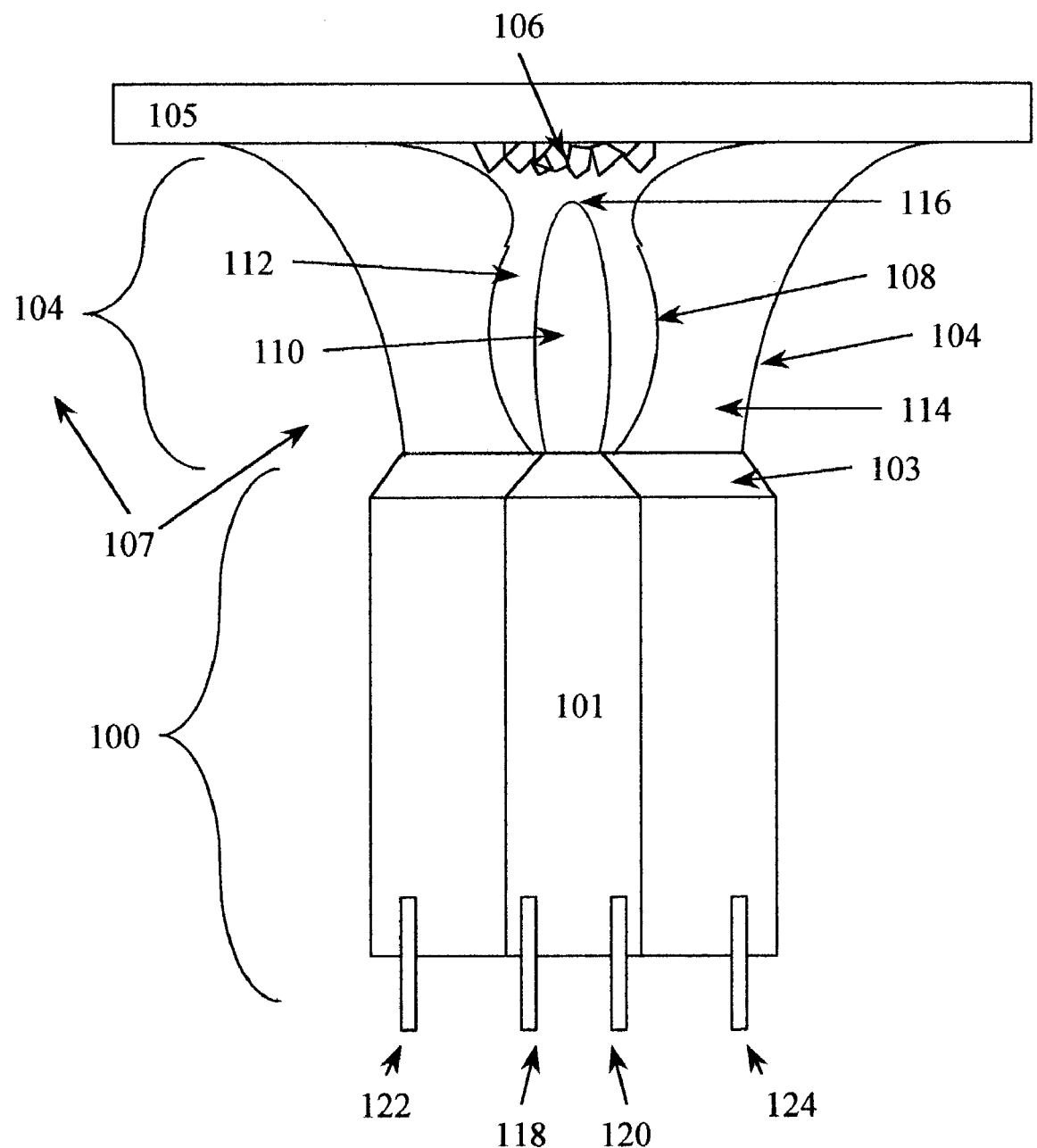
FIG. 1 is a schematic illustrating a composite flame deposition head used for the deposition of diamond.

FIG. 1 is a schematic representation of an oxyacetylene torch 100 producing a flame 104 impinging upon a substrate 105. Although the oxyacetylene torch 100 is not necessarily the preferred burner used in applicant's process, it is shown in FIG. 1 for the same of simplicity in representing his preferred process.

The use of an oxyacetylene torch in producing diamond material is well known. Reference may be had, e.g., to U.S. Pat. No. 5,340,401 (diamond deposition cell), U.S. Pat. No. 5,182,093 (diamond deposition cell), U.S. Pat. No. 5,674,572 (enhanced adherence of diamond coatings), U.S. Pat. No. 5,418,018 (chemical vapor deposition of diamond films), and the like. The entire disclosure of each of these United States patents is hereby incorporated by reference into this specification.

As is known to those skilled in the art, an oxyacetylene torch is one embodiment of a "combustion torch." A "combustion torch" is any torch that utilizes a combustible hydrocarbon gas and oxygen. The use of such a "combustion torch" in producing diamond material is also well known. Reference may be had, e.g., to U.S. Pat. No. 5,338,364 (process for producing diamond film), U.S. Pat. No. 5,217,700 (apparatus for producing diamond film), U.S. Pat. No. 5,863,604 (combustion chemical vapor deposition of diamond films and coatings), and the like.

Referring again to FIG. 1, and in the preferred embodiment depicted therein, an oxyacetylene torch 100 comprised of inner nozzle 101 and outer nozzle 103 is depicted.

The torch 100 depicted in FIG. 1 produces a composite flame 104, i.e., a flame with more than one flame region, each of which has a different chemical composition.

Referring again to FIG. 1, the composite flame 104 produced by torch 100 impinges upon the substrate 105 and deposits diamond material 106 thereon.

The Flame Core 108

In the preferred embodiment depicted in FIG. 1, the composite flame 104 is comprised of a core 108. The flame core 108, in turn, is comprised of an inner cone, also know as the plasma section 110, and an outer cone also known as a feather 112.

Referring again to FIG. 1, and in the preferred embodiment depicted therein, it will be seen that flame sheath 114 completely surrounds the flame core 108 so that no portion of the flame core 108 is exposed to the ambient atmosphere 107.

As is known to those skilled in the art, a flame core is the central part of a flame in which the primary chemical reaction(s) take place. Within the flame core is the inner cone 110 (which is the hottest part of the flame core, and in which plasma is generated), and a feather section.

Typically the inner cone 110 of the core 108 has a different color than the sheath 114. In one embodiment, the inner cone 110 of core 108 has a violet color, and the sheath 114 has an orange color.

The inner cone 110 of the core 108 preferably is at a specified distance from the substrate 105. In general, the leading edge 116 of the plasma section 110 is disposed no more than about 5 millimeters from the substrate 105.

The inner cone 110 of the core 108 is preferably produced by the incomplete combustion of hydrocarbon gas(es) and oxygen, which are fed into nozzle 101 in the direction of arrows 118 and 120. In order to properly position the leading edge 116 of the inner cone 110 vis-à-vis the substrate 105, one may first flow the hydrocarbon gas and the oxygen into the nozzle 101 and combust such gases and, thereafter, with reference to the flame thus produced, position the leading edge 116 of such flame at the proper distance from such substrate 105. Thereafter, one may then combust gases sufficient to create the sheath 114.

Referring again to FIG. 1, and in the preferred embodiment depicted therein, one may feed any combustible hydrocarbon gas into nozzle 101, provided that the combustion of such gas preferably produces substantial amounts of energy. In one embodiment, such combustion produces flame temperatures in excess of 2,000 degrees Centigrade.

By way of illustration and not limitation, one may use gases such as, e.g., benzene, propadiene, map gas, acetylene, and the like. In general, the hydrocarbon gas fed into nozzle 101 preferably has a heat of formation of at least about 20 kilocalories/gram-mole.

It also preferred that the hydrocarbon gas fed into nozzle 101 preferably has a molecular weight less than about 85 AMU's and, more preferably, less than 50 AMU's. In one embodiment, the molecular weight of the hydrocarbon gas is less than about 30 AMU's.

It is preferred that the flame temperature of the hydrocarbon gas, when combusted with at least an equimolar amount of oxygen, be at least about 2,000 degrees Celsius and, more preferably, be at least about 2,300 degrees Celsius. Means for determining the flame temperature of a hydrocarbon gas are well known. Reference may be had, e.g., to U.S. Pat. Nos. 6,135,760, 6,071,114, and the like. The entire disclosure of each of these United States patents is hereby incorporated by reference into this specification.

One may use mixtures of two or more such hydrocarbon gases. Additionally, one may feed hydrogen into nozzle 101 provided that the flame produced has a high enough flame temperature.

By way of illustration, one may use Brown's gas in combination with one or more of the aforementioned hydrocarbon gases in nozzle 101. This gas is well known and is described, e.g., in U.S. Pat. No. 6,021,915, the entire disclosure of which is hereby incorporated by reference into this specification. As is disclosed in such patent, "The Brown's gas that is used in the present invention is itself a non-explosive mixed gas that consists of hydrogen and oxygen mixed in a molar volume ratio of 2:1, and it is obtained by electrolysis of water; and it is known that the combustion thereof causes the molecular or atomic hydrogen and oxygen to produce heat of the reaction, thereby bringing about a quite high combustion temperature. In the present invention, the Brown's gas is combusted by using a torch nozzle and an igniter or the like for producing an ignition spark, to produce a highly reducing flame of about 2,300° C., and preferably the tip of the flame good in reactivity is brought in contact with the above mixed gas flow. The number of the Brown's gas combustion burners for bringing the Brown's gas flame in contact with the above mixed gas flow to combust the mixed gas may be 1 or 2 or more; preferably the Brown's gas combustion burners are used 2 or more, and more preferably 2 or 3 in number. Thus, the mixed gas is combusted at high temperatures. This is considered in such a way that the Brown's gas flame heats the mixed gas flow as well as interacts with active chemical species produced from the fossil fuel in the mixed gas, to combust the fossil fuel gas to generate a high temperature; this high temperature causes steam explosion of the moisture in the mixed gas, thereby combusting it as a hydrogen/oxygen gas flame (Brown's gas flame) at a high speed, and the flame propagation resulting therefrom leads to combustion throughout the mixed gas. The speed of the high-speed combustion by this steam explosion is, for example, about 6.75 times (linear velocity: 2.7 m/s) that of the combustion of propane."

When Brown's gas is used in the process of the invention within nozzle 101, it is preferred to use at least about 60 volume percent of the Brown's gas and no more than about 40 volume percent of one or more of the hydrocarbon gases.

Regardless of the identity or identifies of the hydrocarbon gas(es) used, it is preferred that at least about 10 volume percent of hydrocarbon gas comprise the mixture present within nozzle 101.

In one embodiment, one may add one or more "doping gases" to the hydrocarbon gas and/or the hydrocarbon gas mixture fed to nozzle 101. As will be apparent, the function of such doping gases is to provide electrical conductivity to the diamond material produced. Suitable doping gases include, e.g., silane, diborane, halogens, phosphorous-containing gases, sulfur-containing gases, nitrogen, nitrogen-containing gases, and the like. In general, when a doping gas or gases is used, it is present at a concentration of less than about 1 volume percent.

Referring again to FIG. 1, and in the preferred embodiment depicted therein, it is also preferred to feed either oxygen and/or an oxygen-containing gas in the direction of arrow 120 into nozzle 101. Thus, e.g., one may use oxygen, ozone, atomic oxygen, nitrous oxide, and/or any other oxidizing gas which, when combined with the hydrocarbon fuel, will produce a flame with the required properties. When an oxygen-containing gas is used in addition to or instead of oxygen, it is preferred to utilize a gas that will form oxygen in situ.

It is preferred to use a certain ratio of carbon and oxygen (C/O) within nozzle 101.

In general, the hydrocarbon is present in slight stoichiometric excess, there being from about 1.01 to about 1.1 moles of carbon for each mole of oxygen, based upon the conversion of carbon to carbon monoxide. The oxygen or oxygen containing gas is preferably fed into nozzle 101 at a flow rate adapted to produce the desired stoichiometry.

In one embodiment, in addition to the hydrocarbon gas (es) and the oxygen gas(es), one may feed growth-enhancing gas(es) into nozzle 101. Suitable growth-enhancing gases include nitrogen, halogens (such as, e.g., chlorine), diborane, silane, disilane, and the like. In general, when such a gas is used, it is present at a concentration of no more than about 10 volume percent.

The gas mixture disposed within the nozzle 101 is ignited to form the flame core 108. In the process of this invention, it is preferred that flame core 108 be completely surrounded by flame sheath 114 so that no portion of flame core 108 is exposed to the atmosphere 107.

The Flame Sheath 114

The flame sheath 114 is formed by combusting a mixture of gases within the outer nozzle 103 that differs in composition from the mixture of gases within inner nozzle 101. Whereas the mixture within the outer nozzle 103 contains less than about 5 volume percent of hydrocarbon gas, the mixture within inner nozzle 101 contains at least about 10 volume percent of hydrocarbon gas.

Referring again to FIG. 1, and in the preferred embodiment depicted therein, it will be seen that the flame sheath 114 is preferably contiguous with at least a portion of flame core 108. This contiguity is not essential, and there may be gap between the flame core 108 and the flame sheath 114, as long as the sheath 114 shields the core 108 from the atmosphere 107. This shielding spatial relationship may be achieved by using one nozzle assembly with inner and outer orifices, as shown in FIG. 1. Alternatively, one may utilize two ore more separate nozzles whose flames are combined in the proper location to provide the desired composite flame.

Referring again to FIG. 1, and in the preferred embodiment depicted, the composite flame 104 is comprised of both the flame sheath 114 and the flame core 108, preferably in a ratio of at least about 55 volume percent of sheath 114, and less than about 45 volume percent of core 108, provided that the ratio, volume/volume, of said sheath 114/core 108 is generally at least about 1.5/1.

The sheath gas 114 is preferably at a temperature of at least about 250 degrees Celsius. In one embodiment, the temperature of the sheath gas 114 is from about 350 to about 650 degrees Centigrade. In another embodiment, the temperature of the sheath gas 114 is from about 450 to about 650 degrees Celsius.

The sheath 114 is comprised of oxygen, hydrogen, and water. The constituents of sheath 114 are fed via lines 122 and 124. The gas fed via lines 122 and 124 is collectively comprised of at least about 20 volume percent of hydrogen and oxygen, by total weight of all gases fed to nozzle 103.

The desired mixture of hydrogen and oxygen may be fed to nozzle 103, and/or one or both of said gaseous components may be formed in situ within such nozzle 103. With regard to the hydrogen and oxygen so fed to nozzle 103, or formed therein, it is preferred at least 2 moles of hydrogen is fed or formed for each mole of oxygen. In one embodiment, from about 2 to 2.2 moles of hydrogen are fed and/or formed in situ for each mole of oxygen fed.

In one embodiment, in addition to the oxygen and hydrogen fed, up to about 50 volume percent of water vapor is fed via line 122 and/or line 124.

In one embodiment, an inert gas (such as, e.g., argon) may be fed into nozzle 103. In this embodiment, it is preferred to feed less than about 20 volume percent of such insert gas to nozzle 103.

In one embodiment, hydrogen peroxide may be fed into nozzle 103 as a replacement for part or all of the water, preferably in an amount up to about 10 volume percent.

In another embodiment, ozone may be fed into nozzle 103 as a replacement for part or all of the oxygen.

In another embodiment, Brown's gas may be fed into nozzle 103 as a replacement for all or part of the oxygen and/or the hydrogen.

In another embodiment, a liquid acid (such as phosphoric acid) may be added to the water prior to the time it is fed into nozzle 103. In this embodiment, it is preferred to add sufficient acid so that the pH of the water is less than about 4.0. Without wishing to be bound to any particular theory, applicant believes that the lower the pH of the system, the more hydrogen ions are formed therein.

In one embodiment, water may be introduced into nozzle 103 as a means of regulating the temperature of the sheath gas. The percent weight of water used should be below 50 percent and should generally be kept below 20 percent. It is preferred, in this embodiment, to use at least about 2 weight percent of water.

In another embodiment, an inert gas, such as argon, nitrogen, and the like, may be introduced into nozzle 103 as a means of regulating the temperature of the sheath gas 114. The percent volume of such as gas used should preferably be less than about 20 percent, and more preferably less than about 10 percent, although it is preferred to use at least 2 percent of such gas.

It is preferred that the sheath gas 114 contain ionized species of both hydrogen and hydroxyl moieties, such as, e.g., hydroxyl ion, hydrogen ion, and the like. It is preferred that, on balance, the sheath gas 114 present a reducing atmosphere. As is known to those skilled in the art, a reducing atmosphere is an atmosphere (such as, e.g., hydrogen) that readily provides electrons to a chemical reaction.

Regardless of the composition of the gas within the nozzle 103, when combusted it forms the flame sheath 114 that preferably completely surrounds the flame core 108.

In one preferred embodiment of the invention, and without wishing to be bound to any particular theory, applicant believes that the sheath gas performs four functions. The first function is to provide a physical barrier between the reacting process gas and the atmosphere. The second function is to remove, through chemical etching, unwanted graphite deposited by the outer edge of the process gas combustion flame; this is achieved by means of previously described hydrogen and oxygen radicals. The third function is to preheat the substrate for the moving deposition head, as will be described later; this is achieved through the proper combination and combustion of hydrogen, oxygen, argon, and water. The fourth function is to help reduce the heat generated by the flame, by limiting the combustion of CO, hydrogen, and unburned hydrocarbons upon contact with the ambient air 107.

The reactions undergone within the core 108 produce several types of carbon, including graphite and diamond material. Without wishing to be bound to any particular theory, applicant believes that both the hydrogen ions and the hydroxyl ions preferentially etch the graphite form of carbon, forming carbon monoxide and carbon dioxide. However, these radical moieties are substantially non-reactive with the diamond form of carbon. Thus, the presence of the hydrogen and the hydroxyl ions in the system preferentially encourages the removal of the undesired graphite and the accumulation of the desired form of carbon material.

In another embodiment, not shown, this preferential etching capability can be used to remove non-diamond forms of carbon from any environment in which it is not desired.

As will be apparent, the faster the hydroxyl ions and the hydrogen ions are generated, the faster they will etch away the graphite, and the faster this will encourage the formation of the preferred diamond species.

In one preferred embodiment, no more than about a stoichiometric amount of hydrogen and/or hydroxyl radicals should be formed so that only enough of such radicals are formed to etch away only the graphite form of carbon. This will vary, depending upon such factors as the reaction rates of the various reactions, including the reaction forming both graphite and diamond. The latter reaction rate will vary depending upon such factors as the stoichiometry of the reagents, the temperature, etc.

In one embodiment, the process of the invention is conducted at substantially atmospheric pressure or superatmospheric pressure. In general, the higher the pressure, the higher the reaction rate. In one embodiment, the process of this invention is conducted at a pressure of from about 100 to about 2,000 atmospheres.

One preferred apparatus of the invention.

Figure 2:
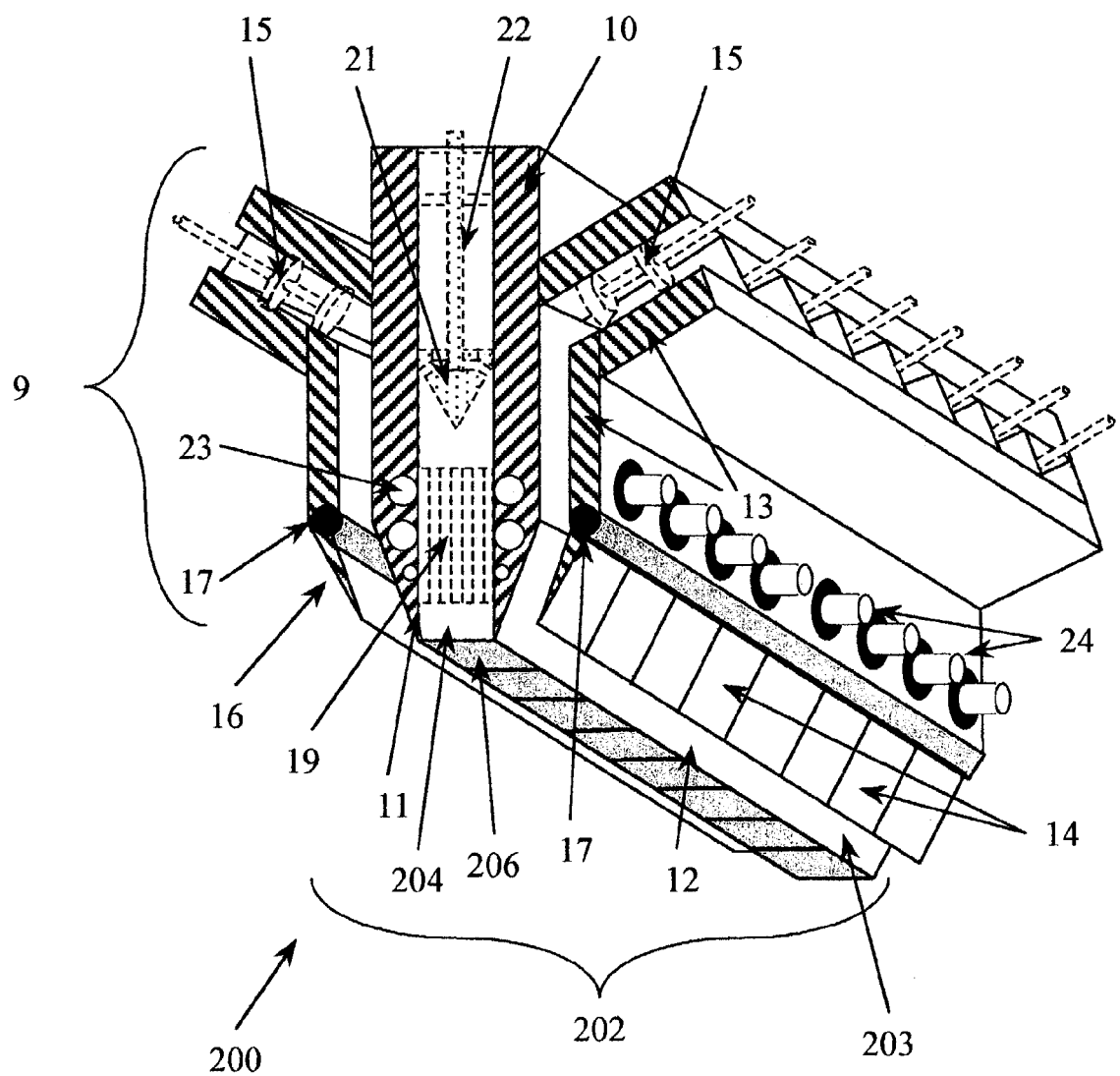
FIG. 2 is an isometric projection schematic with a cut-away side illustrating one preferred embodiment of the invention consisting of a deposition head containing eight sub-nozzles.

FIG. 2 illustrates a preferred apparatus 200 that is comprised of a series of torch units 9 placed together in linear fashion to comprise a deposition head 202. The sub-nozzles 204 of each torch unit 9 are preferably square in cross section rather than round, although other embodiments may use a rectangular cross-section.

Referring again to FIG. 2, it will be seen that each sub-nozzle 204 comprises an opening 206 with a maximum dimension of form about 3 to about 10 millimeters. In the embodiment depicted in FIG. 2, each such sub-nozzle 204 is comprised of four walls, each of which are relatively thin, having a thickness of less than about 0.5 millimeters at the gas exit point.

It is preferred that the assembly of sub-nozzles 204, and torch units 9, collectively create a single flame across the collective rectangular large nozzle 12. As will be apparent, the design depicted in FIG. 2 minimizes the turbulence that frequently occurs when circular nozzles are placed in close proximity to each other.

In the embodiment depicted in FIG. 2, a substantially rectilinear cross-section is shown for sub-nozzles 204, as with the nozzle openings 206. In other embodiments, not shown, one may use rectangular shapes.

Figure 3:
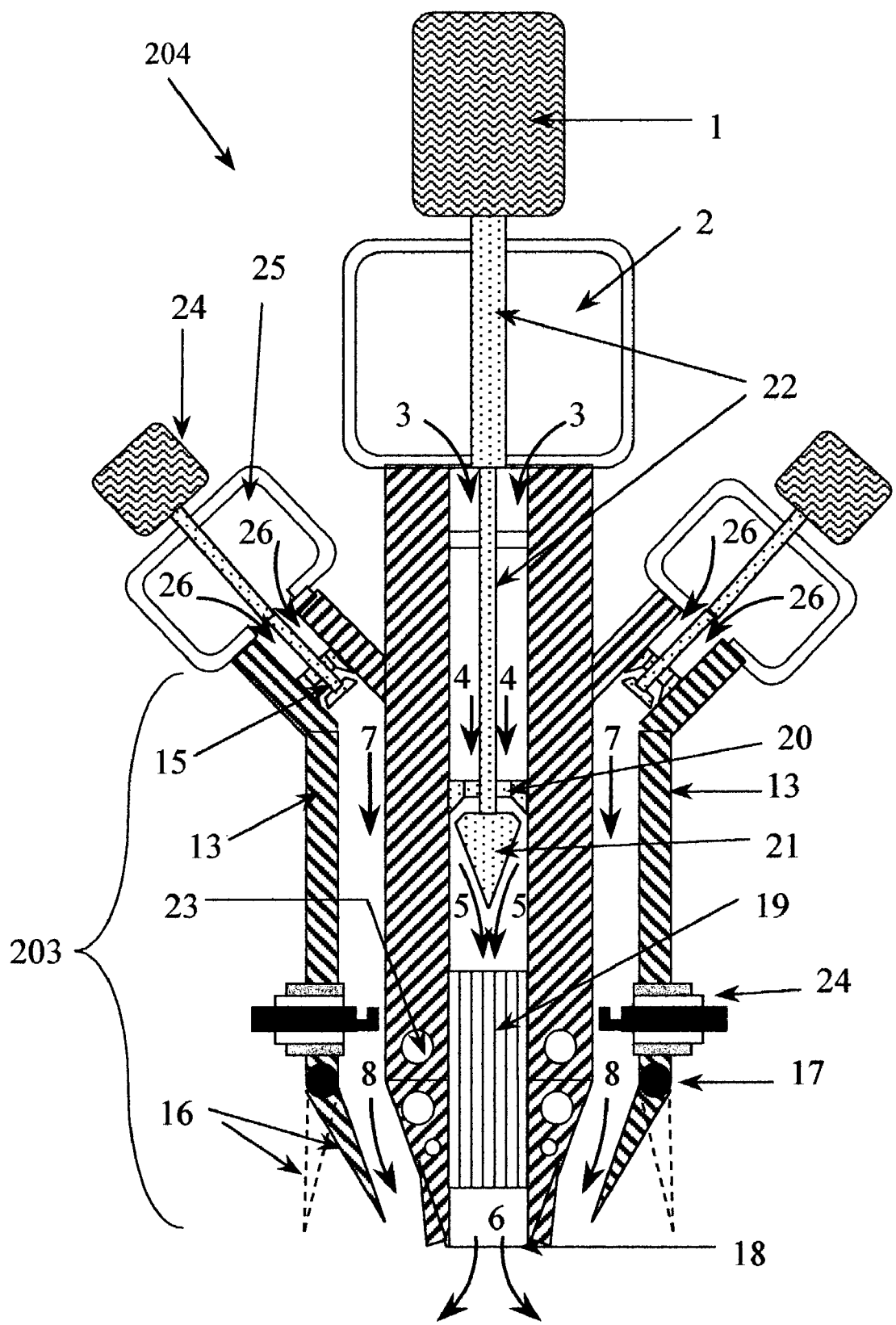
FIG. 3 is a cut-away side schematic illustrating a torch sub-nozzle assembly of one preferred embodiment of the invention.

Referring again to FIG. 2, and also to FIG. 3, and in the preferred embodiment depicted therein, it is preferred that the body of each sub-nozzle 204 consist essentially of brass, bronze, or any other metal or metal-containing material that will not form a metal carbide in the presence of the reagents used in the instant process and at the specified temperatures. It is also preferred that the material so used not allow carbon to enter into a solid solution with the material used. Thus, by way of illustration, the sub-nozzles 204 may be constructed of bronze or brass.

Referring again to FIG. 2 and FIG. 3, and in the preferred embodiment depicted therein, it will be seen that cooling channels 23 are preferably disposed throughout each sub-nozzle 204 and preferably connect to the cooling channels 23 of adjacent sub-nozzles 204.

Figure 4:
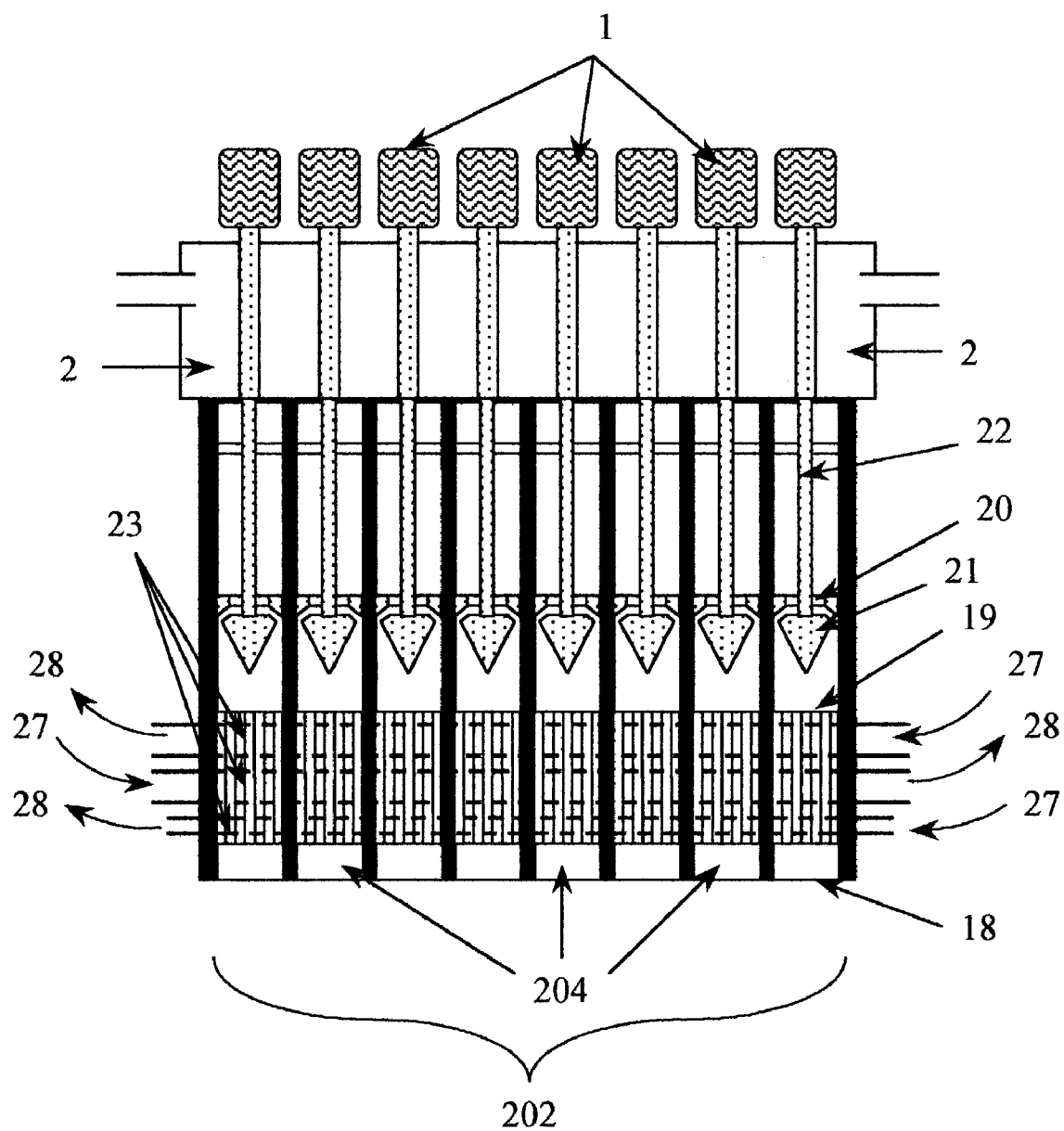
FIG. 4 is a cut-away front schematic illustrating one preferred embodiment of the invention consisting of a deposition head containing eight sub-nozzles.

In the embodiment depicted in FIG. 4, the cooling channels 23 of the sub-nozzles 204 positioned on the end of the torch head 202 are connected to the input lines 27 and the output lines 28 of a cooling unit (not shown). In one embodiment, a cooling fluid, such as glycerol or water, is used.

In another embodiment, a cooling gas such as argon, nitrogen, helium, and the like, is used.

Referring again to FIGS. 2 and 3, and in the preferred embodiments depicted therein, mounted on each side of the deposition head 202 is a series of sheath gas units 13 collectively forming a sheath gas nozzle 203. In the embodiment depicted, the sub-nozzles 14 of these sheath gas units are also rectangular in cross-section. Furthermore, it is preferred that the sheath gas nozzle body 13 consists essentially of inert metal-containing material such as, e.g., bronze, brass, etc.

Referring again to FIGS. 2 and 3, and in the preferred embodiment depicted therein, each sheath gas unit 13 preferably contains a flow control valve 15 and a variable geometry sub-nozzle 16 with a hinged pivot point 17.

Referring again to FIG. 3, each sub-nozzle unit 204 preferably contains a torch opening 18, a laminar conditioner 19, and a control valve connected to a measurement and feedback system to precisely control the size and temperature of the flame. The flow and control of the input gas mixture is achieved in one embodiment by means of a control valve system comprised of a valve actuator 1, a mixing manifold 2, a valve seat 20 and a low turbulence valve 21. The source gasses enter the manifold 2 where they are mixed before entering the nozzle 3. The design of the manifold is not specific to the invention, and any suitable manifold may be used provided that it meets the following requirements: (1) complete turbulent mixing, and (2) suppression of spontaneous combustion of the fuel and oxidizer. The gasses 4 proceed down the nozzle where they pass the control valve seat 20. The low turbulence control valve 21 is moved in reference to the valve seat by the valve actuator through a control shaft 22. In one embodiment the control valve may also serve as a flame arrestor for use with combustible gas mixtures. The gasses 5 flow past the control valve through a laminar conditioner 19, which serves to remove turbulence and force the gas into a state of laminar flow. In this embodiment the laminar conditioner is composed of small ceramic tubes 0.5 mm in diameter. These tubes may be smaller than 0.5 millimeters diameter and made of any suitable material such as SiC, $Al_2O_3$, SiN, ZrO, TiO or any other stable ceramic of sufficient strength and resistance to thermal decomposition. In a different embodiment, tubes could be made of tungsten, molybdenum, or any other refractory metal of sufficient strength, resistance to thermal decomposition and resistance to carbonization. In another embodiment, alternative structures such as fins are used to produce a laminar conditioner. After passing through the laminar conditioner the gas mixture 6 exits the nozzle at the torch opening 18 where it is ignited to produce a flame.

Referring again to FIG. 2 and FIG. 3, the flow and control of the sheath gas mixture is achieved in the preferred embodiment by means of a valve control system comprised of a valve actuator 24, a mixing manifold 25, a valve 15, and a variable geometry sub-nozzle 16. The sheath gasses enter the manifold 25 where they are mixed before entering the nozzle 13. The gasses 26 proceed down the nozzle where they pass the control valve 15. In the preferred embodiment depicted, an automated valve actuator operates each sheath gas control valve. In another embodiment, the sheath gas control valve is actuated manually. The sheath gas 7 then flows past an igniter 24 where any combustible gasses are ignited. It is preferred that the igniter consists of a device generating a continuously pulsed electrical spark, such as a modified spark plug. In another embodiment, the igniter initiates combustion using a heated filament or glow plug. The ignited sheath gas 8 then flows through a variable geometry nozzle vent 16 before exiting on either side of the process gas sub-nozzle. In the preferred embodiment, an automated actuator is used to position the variable geometry nozzles. In another embodiment, the variable geometry nozzles are operated manually.

A torch unit along with its two sheath gas units makes up a head sub-nozzle 204. These head sub-nozzles are standardized and modular, and a series of them can be connected together to produce a deposition head 200 of any length. This standardization and modularity greatly reduce the capital costs of producing large deposition machines and are unique features of this invention.

Properties of the Apparatus Used to Control the Deposition of Material

Figure 5:
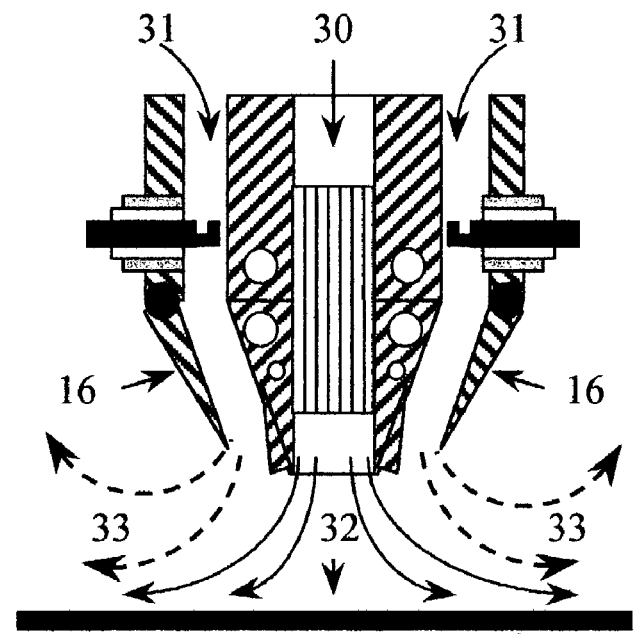
FIG. 5 is a schematic illustrating one position of the mechanical control of the flow of gas from the preferred embodiment of the invention.

In addition to the manipulation of the process gas and sheath gas chemistries described above, reaction conditions can also be manipulated mechanically. Referring to FIG. 5, it will be seen that, by varying the process gas flow rate 30, the sheath gas flow rate 31, and nozzle geometry 16, control of flame velocity and flame turbulence is achieved. With the sheath gas nozzle constricted, the sheath gas moves at high velocity from the nozzle 33. The low pressure of the high velocity stream allows the process gas stream 32 to undergo expansion, lowering its velocity and moving the process towards a "stagnation flow" or reaction-limited regime.

Figure 6:
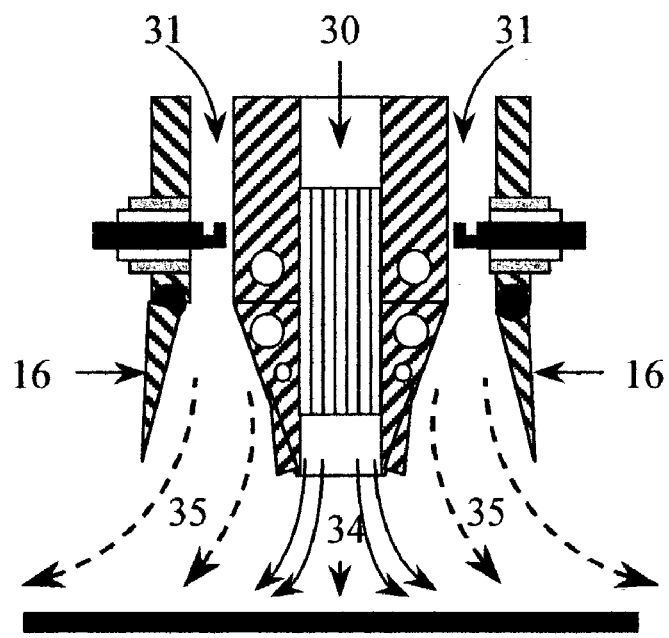
FIG. 6 is a schematic illustrating another position of the mechanical control of the flow of gas from the preferred embodiment of the invention.

Referring to FIG. 6, it will be seen that, by opening the sheath gas nozzle, the sheath gas undergoes expansion and lowers its velocity 35. The low velocity and increased pressure of the sheath gas stream causes the process gas stream 34 to constrict and move at high velocity, which moves the process towards a diffusion-limited regime. This aspect of the invention allows the pressure and flow rates of the process gas over the substrate to be varied by the mechanical manipulation of the sheath gas stream.

Figure 7:
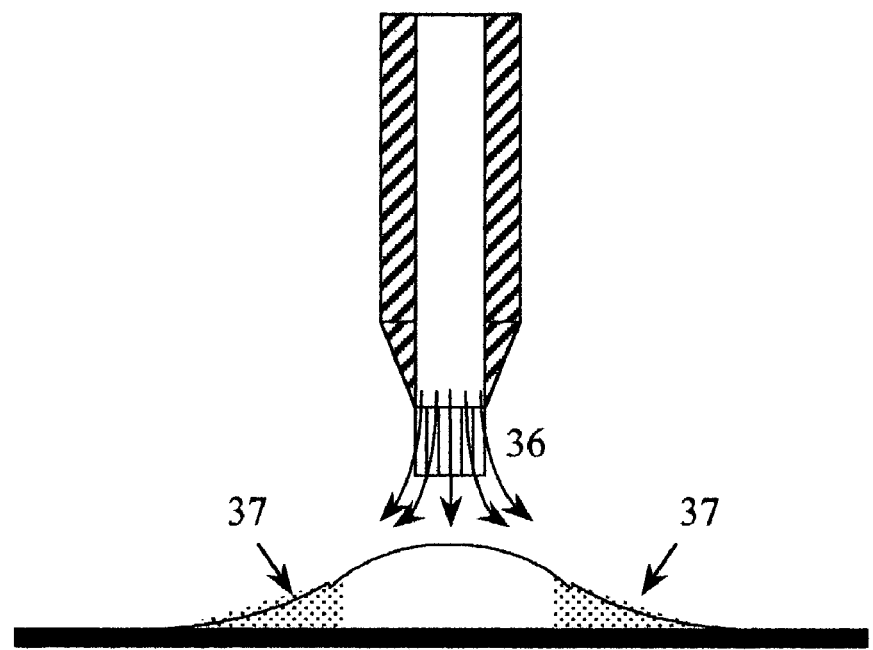
FIG. 7 is a schematic illustrating the deposition head and the material deposited from a conventional combustion torch system.

Referring to FIG. 7, it will be seen that a standard combustion torch deposition system leaves an annular region 37 outside of the center region deposited by the flame 36 which is generally of low quality and containing large amounts of unwanted graphite 37.

Figure 8:
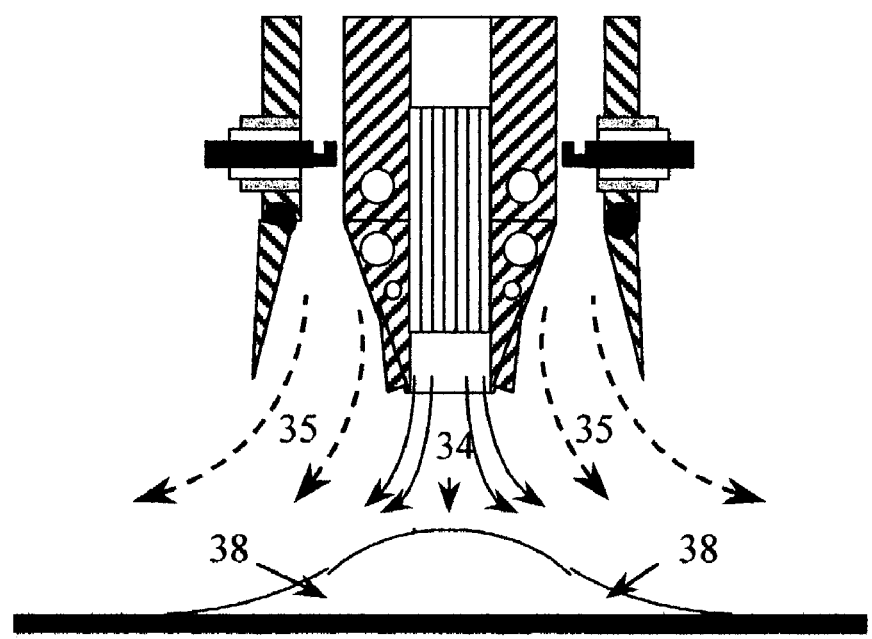
FIG. 8 is a schematic illustrating the deposition head and the material deposited from the invention.

Referring to FIG. 8, by means, described earlier, of controlling the sheath gas pressure, chemistry, and temperature 35, and thus the characteristics of the process gas stream 34, the outer regions of the deposition remain free of graphite impurities 38.

Figure 9:
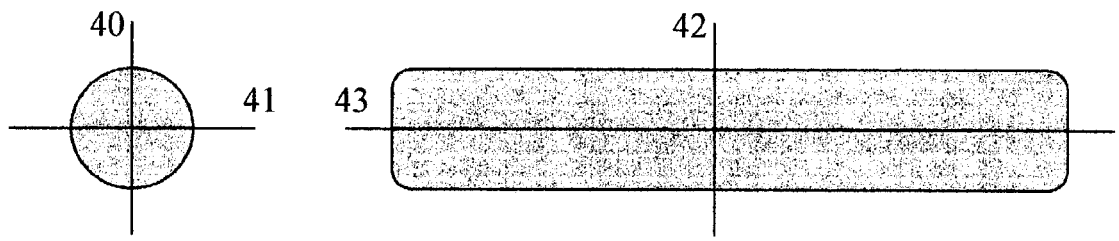
FIG. 9 is a schematic illustrating from a top view the material deposited from a conventional combustion torch system and from the invention.
Figure 10:
FIG. 10 is a schematic illustrating from a cross-sectional side view of the deposition heads and the material deposited from a conventional combustion torch system and from the invention.
Figure 11:
FIG. 11 is a schematic illustrating from a different cross-sectional side view of the deposition heads and the material deposited from a conventional combustion torch system and from the invention.

By controlling the deposition parameters across the length of the deposition head, a uniform rate and area of deposition is achieved across the length of the head. Instead of a small annular region of deposition created by a single round nozzle, a long rectangular region is created. Referring to FIG. 9, FIG. 10, and FIG. 11, the properties of the material deposited by a conventional combustion torch show a radial symmetry, whereas the properties of the material deposited by the invention show a linear symmetry, where the axis of symmetry is parallel to the long axis of the deposition head. Illustrated in FIG. 9 is a top view of deposited material from a conventional combustion torch on the left and that from the invention on the right. The lines 40 and 41 describe two perpendicular cross sections though the material deposited by a conventional combustion torch and the lines 42 and 43 describe two perpendicular cross sections though the material deposited by the invention.

FIG. 10 illustrates a side view of the material deposited by a conventional combustion torch 44 through the cross section 40. It also illustrates a side view of the material deposited by the invention 45 through the cross section 42.

FIG. 11 illustrates a side view of the material deposited by a conventional combustion torch 46 through the cross section 41. It also illustrates a side view of the material deposited by the invention 47 through the cross section 43. The vertical height of the deposited material in FIG. 10 and FIG. 11 is exaggerated for clarity.

Figure 12:
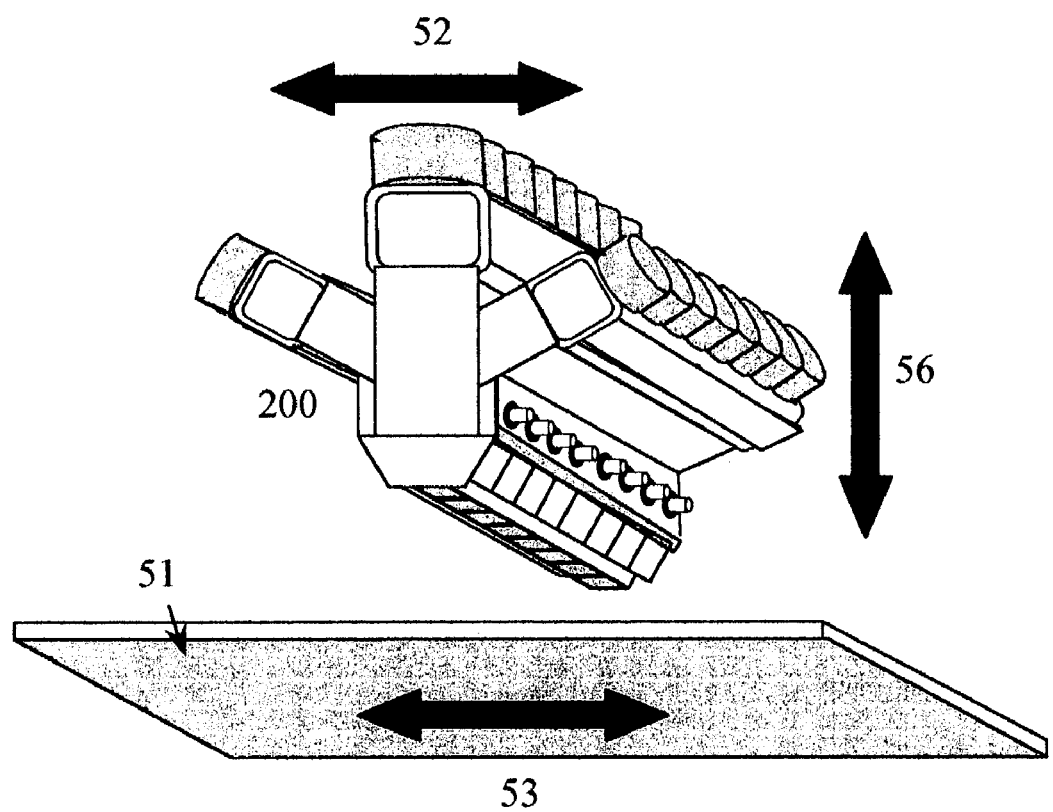
FIG. 12 is a schematic illustrating an isometric projection the deposition head and its position and movement in relation to a substrate on which the deposition takes place.
Figure 13:
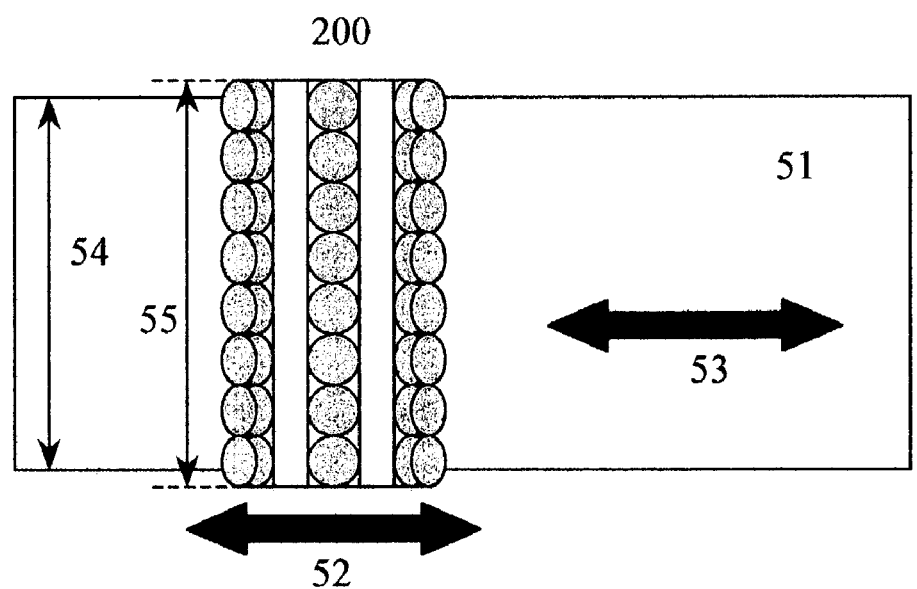
FIG. 13 is a schematic illustrating a top view of the deposition head and its position and movement in relation to a substrate on which the deposition takes place.

In the one embodiment, as illustrated in FIG. 12 and FIG. 13, the deposition head 200 is connected to a movable frame above the stationary work-piece/deposition area 51. The deposition head can then scan across the work-piece in a direction perpendicular to its long axis 52.

In a different embodiment, depicted in FIGS. 12 and 13, the work-piece/deposition area 51 is connected to a movable frame below a stationary deposition head 200. The work-piece/deposition area 51 can then scan below the deposition head 200 in a direction perpendicular to its long axis 53.

In another embodiment, depicted in FIGS. 12 and 13, the deposition head 200 and the work-piece/deposition area 51 are both movable.

In the preferred embodiment depicted in FIG. 13, the width of the work-piece 54 is no larger than the width of the deposition head 55. The deposition head 200 then proceeds to scan across the length of the work-piece/deposition area 51 until the entire work-piece is coated. Multiple passes of the head are preferably used to obtain thicker coatings. Alternatively, or additionally, variations in the speed of the head may be used to control coating thickness.

The deposition head 200 also has the ability to move in the vertical direction 56 in order to place the flame at the proper height above the work-piece/deposition area 51.

Figure 14:
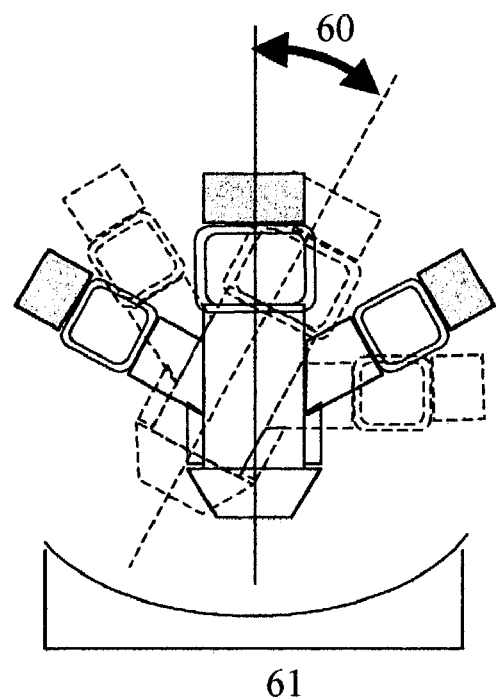
FIG. 14 is a schematic illustrating the ability of the deposition head to be rotated on its axis.

In another embodiment of the invention, depicted in FIG. 14, the deposition head 200 has the ability to be rotated along a horizontal axis 60 parallel to the axis depicted in FIG. 9—43. This allows it to deposit material over surfaces that are not flat 61 with respect to the axis 42 depicted in FIG. 9.

Figure 15:
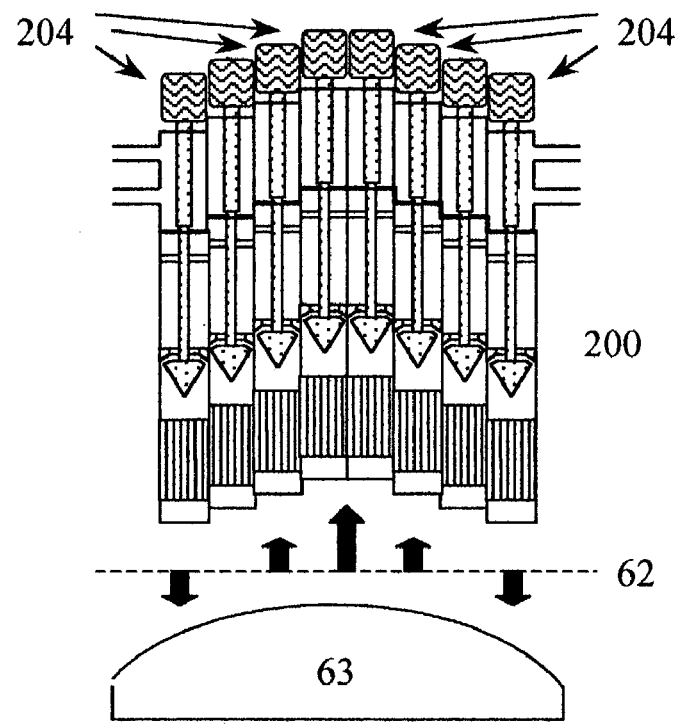
FIG. 15 is a schematic illustrating the ability of the sub-nozzles of the deposition head to be moved individually in the vertical direction in relation to the substrate on which the deposition takes place.

In another embodiment of the invention, depicted in FIG. 15, the deposition head 200 comprises nozzle sub-assemblies 204 that are adapted to move independently of each other 62 in the vertical direction. This allows the deposition head 200 to deposit material over surfaces that are not flat 63 with respect to the axis 43 depicted in FIG. 8.

Properties of the Apparatus Used to Control the Temperature of the Deposition

An aspect unique to this invention is the ability to control the substrate temperature, either partially or completely, through movement of the deposition head. As is known to those skilled in the art, chemical vapor deposition (CVD) of diamond occurs when substrate temperatures between 600° Centigrade and 1100° Centigrade are maintained. For most low-pressure CVD processes, the temperature is maintained through independent substrate heating. For atmospheric pressure processes, the temperature is maintained through active substrate cooling since atmospheric pressure processes deposit far more heat energy into the substrate than low-pressure CVD processes. Since the heat input into the substrate is directly related to the chemical reaction rate, and by inference the diamond growth rate, a substantial amount of energy is required to extract excess heat from the substrate in high growth rate systems. This situation is exacerbated when the substrate is composed of a material with a low coefficient of thermal conductivity.

Figure 18:
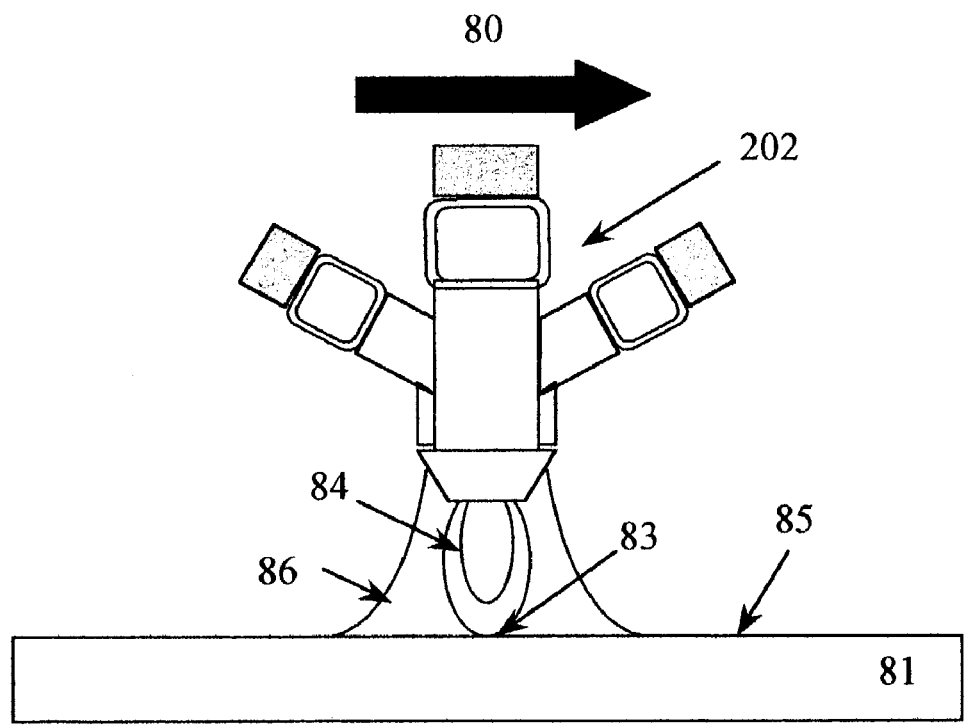
FIG. 18 is a schematic illustrating an aspect of the invention used to control the temperature of the deposition.

Referring to FIG. 18, in the preferred embodiment depicted therein, the velocity 80 of the deposition head 200 in relation to the substrate 81 is such that the area 83 directly under the deposition head 200 (which is also the area where the diamond deposition and growth takes place) remains within the previously stated optimal temperature range of from about 600 and about 1,100 degrees Centigrade.

In the embodiment depicted, a stationary flame 84 placed over a substrate 81 to input heat energy into the substrate. The temperature of the substrate will increase over time until thermal equilibrium is achieved. The rate at which this occurs depends on the specific heat of the substrate, the thermal conductivity of the substrate, the magnitude of the thermal mass, and the rate of heat loss from the system, all of which are subject to the appropriate heat flow equations. Depending on the rate of heat loss from the system, a point 83 located directly under the flame 84 will have a temperature lower than a point on the substrate located a distance away from the flame 85. Thus, the temperature of a point on a substrate is directly related to the dwell time of the flame on that point; the longer the dwell time the higher the temperature, and the shorter the dwell time the lower the temperature. The dwell time can be described as the period of time that the flame resides over any given point on the substrate. From this it can be shown that a point on a substrate can be raised to any temperature T by adjusting the dwell time of the flame, within the limitations $T_R < T < T_M$ where $T_R$ is room temperature and $T_M$ is the maximum temperature attainable by a stationary flame.

The temperature of any point 83 and 85 on the substrate 81 can now be controlled by the velocity 80 of the deposition head 202, since the dwell time is directly dependent on the head velocity 80. In order to insure that the temperature of a given point on the substrate is at all times within the optimal temperature range while under the flame, a certain amount of preheating can be used. This preheating is accomplished by the sheath gas 86, which, containing a significant amount of hydrogen and oxygen, can be ignited. Thus, in addition to the etching of unwanted graphite, and the shielding of atmospheric contaminants, the sheath gas also can serve to regulate the temperature of the substrate.

Figure 16:
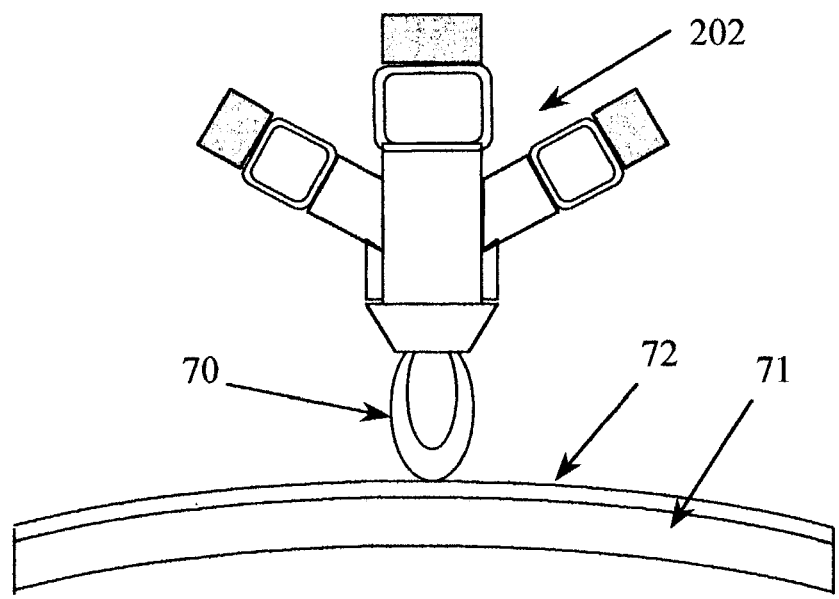
FIG. 16 is a schematic illustrating substrate warping as a result of heat input from a flame.

Properties of the Apparatus Used to Control the Stress of the Deposited Material Referring to FIG. 16, in the case of diamond growth in a stationary high deposition rate system, a major disadvantage is that the entire surface of the top of substrate is subject to high thermal energy input by the flame 70. If the bottom of the substrate 71 is cooled or allowed to float thermally, there will be a temperature differential between the top and bottom of the substrate. This differential is needed to remove excess heat from the top of the substrate and keep it within the optimal temperature range for diamond growth. This temperature differential results in stress along the top surface 72, which, if severe enough, can lead to warping of the substrate. If diamond is deposited on the warped substrate, the diamond will undergo compressive stress when the substrate returns to thermal equilibrium since the thermal expansion coefficient of diamond is less than that of any other material. Often this leads to the deposited diamond loosing adhesion or "peeling off" of the substrate.

Figure 17:
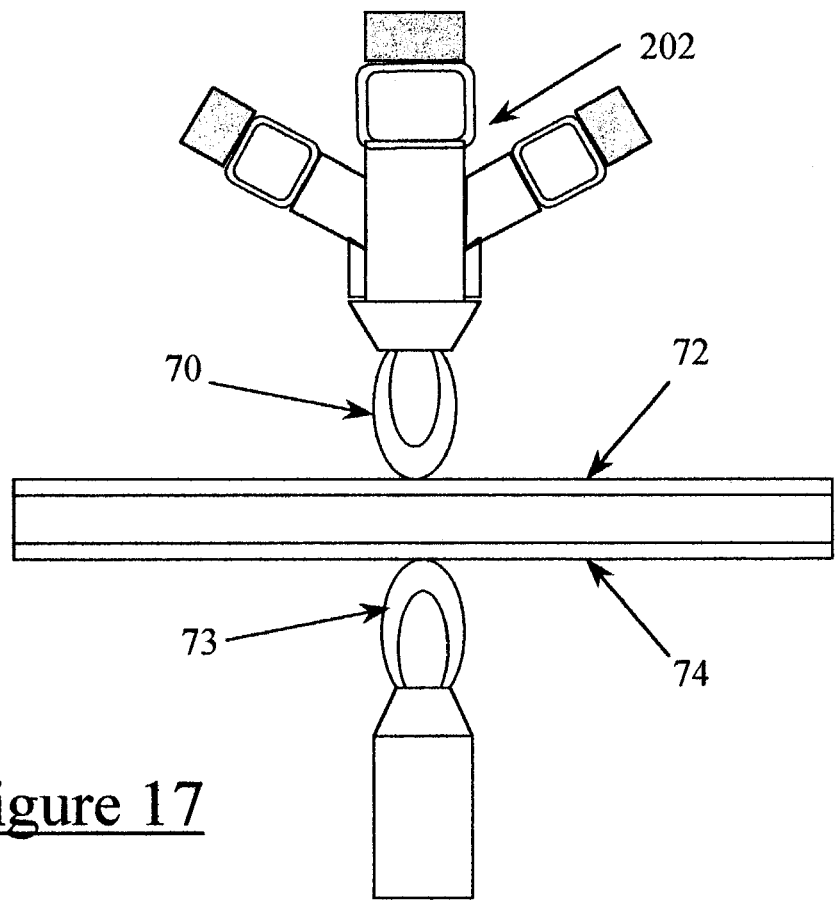
FIG. 17 is a schematic illustrating a solution to substrate warping as a result of using the heat input of two flames.

Referring to FIG. 17, this invention allows one of a number of methods to be employed to avoid the problem of substrate warping. One method, illustrated in FIG. 17, is through the use of another flame 73 for example, to heat the bottom of substrate 74 to a temperature equal to or slightly greater than the temperature of the top of the substrate 72. This avoids warping by equalization of the top and bottom stresses, causing them to cancel each other out. The application of this technique has in the past been available to low deposition rate systems but not with high deposition rate systems since simultaneous heating at high rates from both sides of the substrate will quickly lead to temperatures above the range required for diamond growth.

In one embodiment of the invention, a unique solution is offered to this problem by allowing heating at high rates from both sides of the substrate without exceeding the temperatures required for diamond growth. Referring to FIG. 18, this is accomplished by the fact that the moving head 82 only heats the substrate locally over a small area 83; this small area 83 is less than about 20 square centimeters. The remaining area of the substrate, such as that containing point 85, is allowed to cool and acts as a heat sink drawing excess heat from the area under the flame 83. The same can be said for the addition of another heat source directly under the flame, providing heat input comparable to that of the flame. Though the total heat input of both heat sources is large enough to locally raise the temperature of the substrate into the range required for diamond growth, it is not enough to heat the entire substrate into this range. Thus by manipulation of the ratio of surface heating to bottom heating it is possible to control the thermal stress levels of the substrate, and further engineer these stress levels to minimize substrate warping and improve the adhesion of the diamond deposit.

Method and Apparatus for Plasma Enhancement

Figure 19:
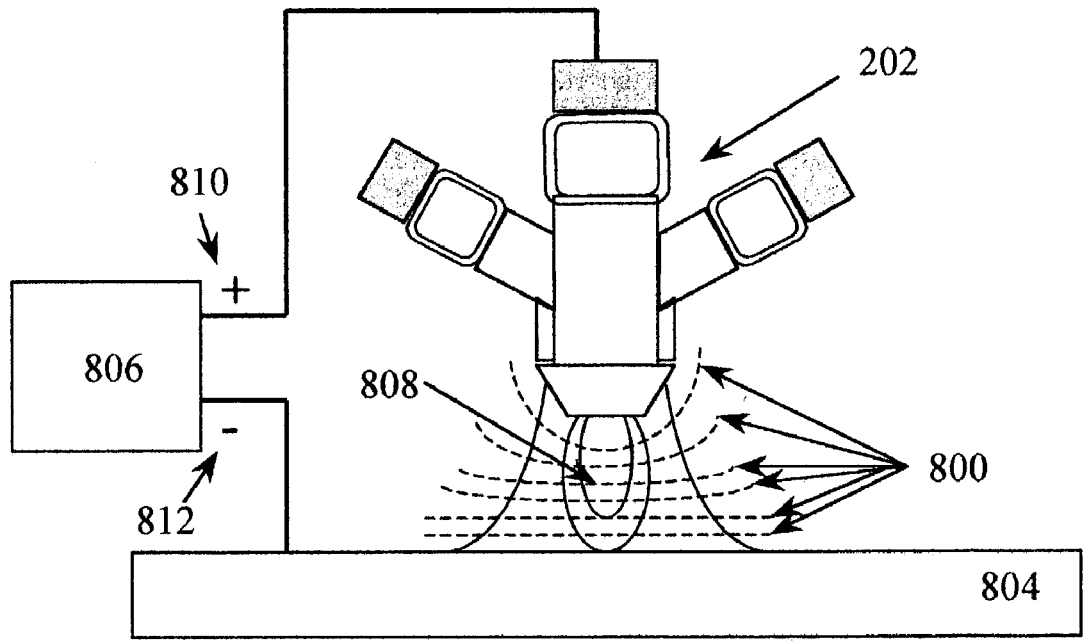
FIG. 19 is a schematic illustrating a method and apparatus for plasma enhancement of the flame.

In one embodiment of the process of this invention, depicted in FIG. 19, the quantity of plasma within the flame is increased. As used herein, the term plasma refers to an electrically conductive ionized gas.

In one embodiment, illustrated in FIG. 19, an electric field 800 is established between the deposition head 202 and the substrate 804, preferably by means of a high voltage direct current power supply 806 operatively connected to said deposition head 202 and said substrate 804. In general, the power supply 806 provides a voltage of at least 1,000 volts. The dashed lines represent the electric potential lines. In one embodiment, the power supply 806 delivers pulsed direct current.

One may use other means of generating or enhancing plasma with a direct current. Thus, e.g., one may use the means disclosed in U.S. Pat. No. 6,222,321, the entire disclosure of which is hereby incorporated by reference into this specification. As is disclosed in such patent, "Plasma processing techniques have found wide-spread use in industry for commercial processes such as plasma vapor deposition, sputtering, etc. These processes have become particularly useful in thin film applications. To generate a plasma, a power supply creates an electric potential between a cathode and one or more anodes that are placed in a plasma chamber containing the gases that are used to form the plasma. When using these processes for deposition, the plasma acts upon the material of a target placed in the plasma chamber that normally comprises the cathode surface. Plasma ions cause target material to be dislodged from the cathode surface. The target materials are then deposited on a substrate deposition surface to form a thin film. The thin film may constitute material sputtered by the plasma from the target surface, as disclosed above, or may be the result of a reaction between the target material and some other element included in the plasma. The materials and elements involved, as well as the specific applications of the plasma processing techniques vary greatly. Applications may range from coating architectural glass to deposition of thin film layers on microchips, or deposition of aluminum layers on compact disks."

"In the past, high frequency voltage sources have been used to generate a high electrical potential that produces a plasma within a plasma chamber. These high-frequency voltage sources are expensive to construct and maintain, as well as dangerous to operate. Additionally, if the deposition material is formed by reaction with an element in the plasma, and further, is electronically insulating, the anode in the chamber can be coated with the insulator; this deposit can then prevent the anode from performing its function of collecting the electrons released from the plasma during the deposition process."

"To overcome these disadvantages, pulsed DC voltage sources have been employed such as disclosed in U.S. Pat. No. 5,303,139 issued Apr. 12, 1994 to Mark, which is specifically incorporated herein by reference for all that it discloses and teaches. Mark discloses a constant voltage pulsed power supply that has alternating pulse polarities. The advantages of such a constant voltage pulsed power supply over the AC power supplies are that they are less expensive, easier to connect and set up, and overcome the problem of coating the anode if used with two target units. That is, the process of reversing polarities allows the electrodes to alternately act as anode and cathode; the sputtering process that occurs during the cathode phase cleans off any deposited insulating material and permits uninhabited operation of the electrode as an anode during the anode phase. Additionally, the process of reversing polarities allows both electrodes to alternatively act as a cathode so that both electrode surfaces are capable of providing target material."

Other conventional means of enhancing the plasma region within the flame 808 may also be used.

In one embodiment of the process of this invention, illustrated in FIG. 19, the field 800 is preferably disposed such that the deposition head 202 is biased positively 810 and the substrate 804 is biased negatively 812. The electric field should have a field strength such that a free electron disposed within such field has an energy of at least about 14 electron volts within its mean free path length. Without wishing to be bound to any particular theory, applicant believes that such a combination of conditions causes an "ion cascade" condition to occur.

Figure 20:
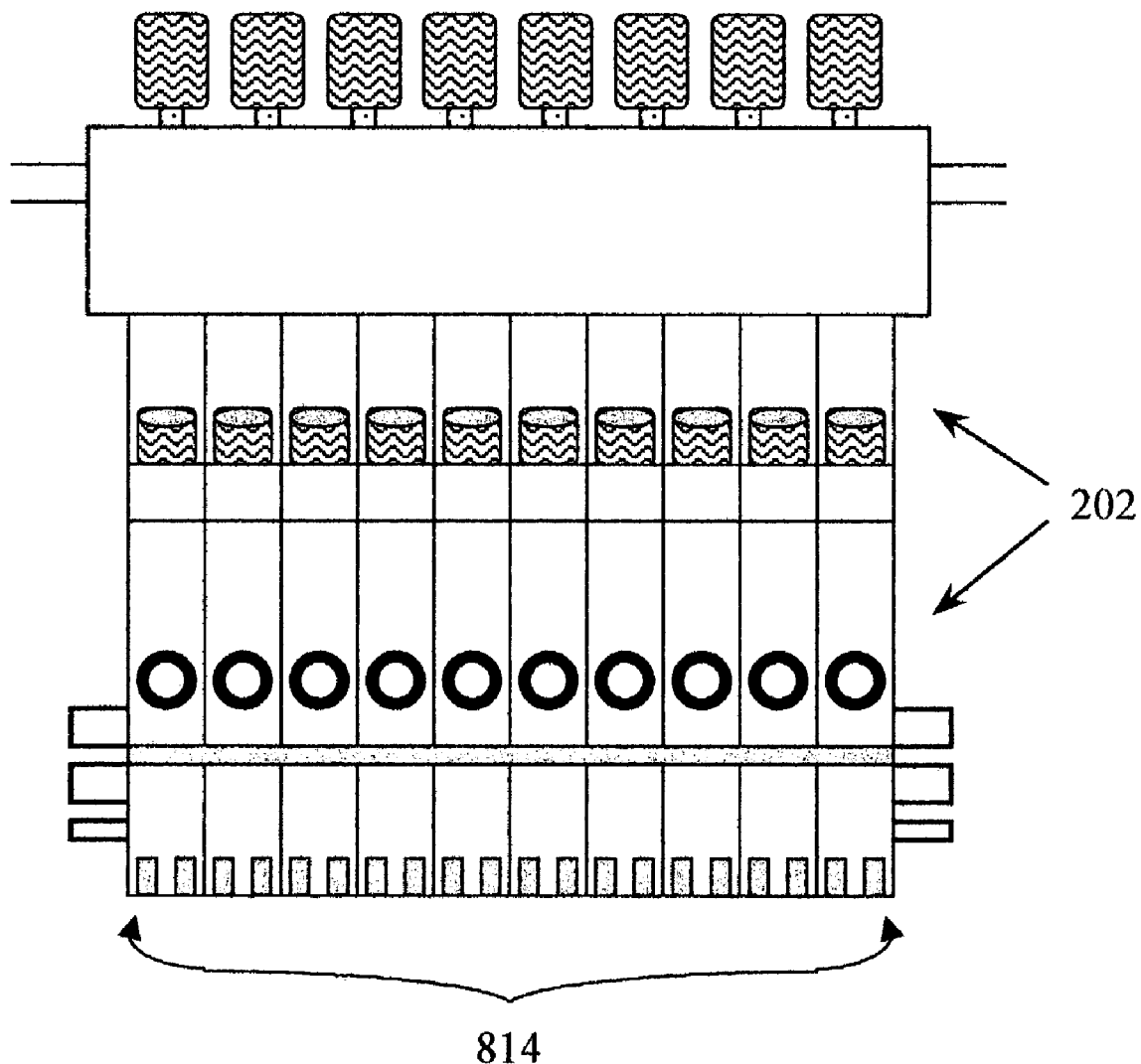
FIG. 20 is a schematic illustrating an arrangement of electrodes used in the apparatus for plasma enhancement of the flame.
Figure 21:
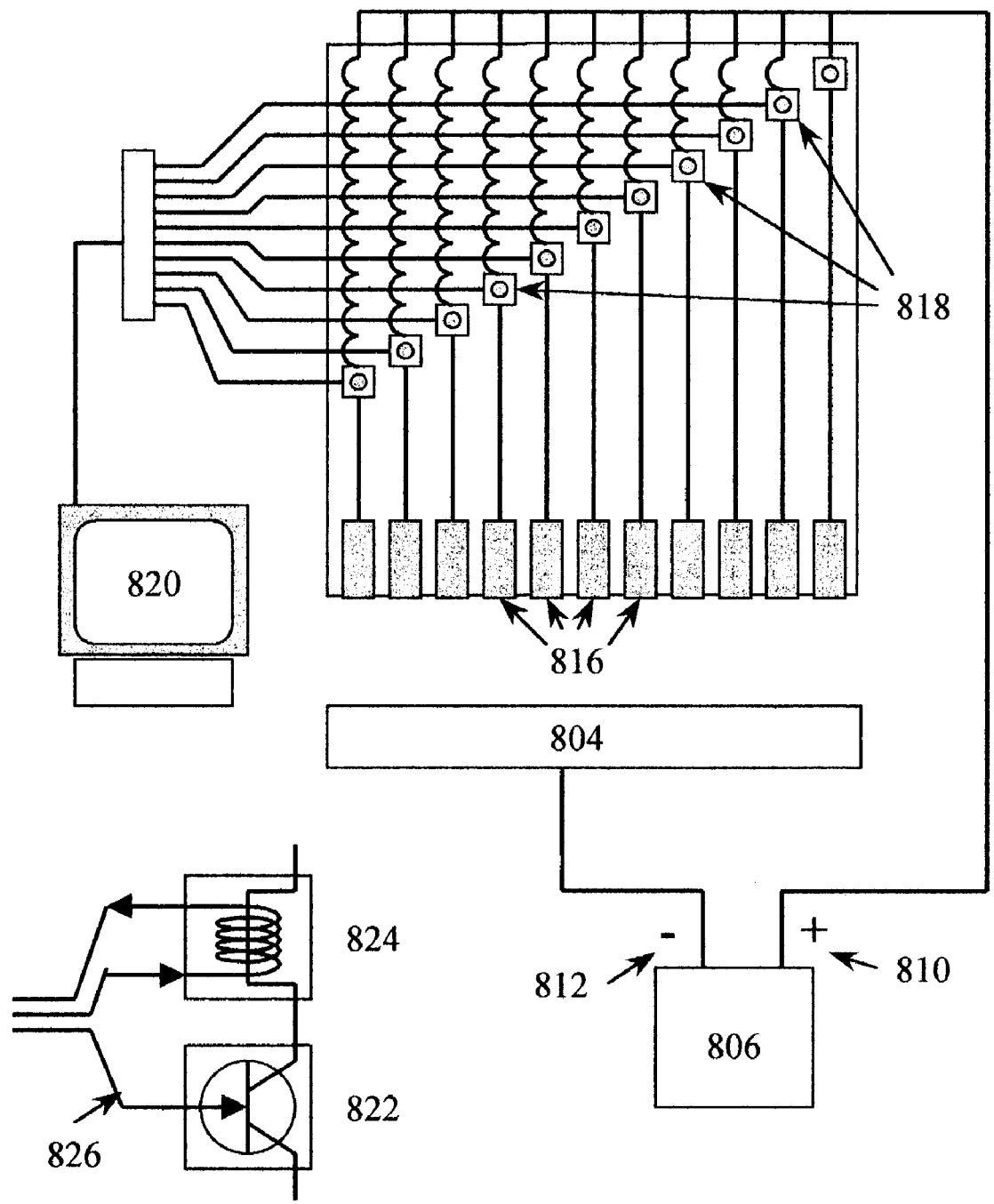
FIG. 21 is a schematic illustrating a method of control and feedback for control of the electrical currents used in the plasma enhancement of the flame.

In another embodiment of the process of this invention, illustrated in FIG. 20, the charge on the deposition head 202 is distributed to the flame by means of an array of electrodes 814. These electrodes may be fabricated out of platinum, iridium, or any other metal capable of withstanding the high heat of the combustion flame while also resisting a chemical reaction to chemical components of the flame. The width and separation of these electrodes should be on the order of one to two millimeters. In order to prevent the discharge of all of the electrical current between any one single electrode 816 and the substrate 804, a scheme of current limitation is employed in a manner represented in FIG. 21. In this configuration, the positive current 810 flowing from the power supply 806 to the electrodes 816 on the head must first pass through a power regulator 818. The function of the power regulator is to monitor and limit the current available to its corresponding electrode 816. The power regulator 818 is composed primarily of two parts; a power transistor 822 which limits the electrical current by means of an applied voltage to the transistor gate 826, and a current monitor 824 which measures the current flowing to the electrode 816. The current monitor may be an induction-type device, as illustrated, but is not limited to electrical induction as a means of measuring current. Other methods, including resistive, magnetic, or solid state transistor, may also be used. The level of the control voltage 826 on the power transistor 822, and hence the level of the current available to the electrode 816, is variable and may be monitored and controlled by a computer 820. Each electrode preferably has its own corresponding power regulator 818 which may be controlled independently of any other, and without wishing to be bound to any particular theory, applicant believes that such a configuration will promote uniform current flow across the width of the head between the positive and negative electrodes.

In one preferred embodiment, the difference of potential between the base 803 of the flame and the substrate 804 is at least about 250 volts and, preferably, at least about 1,000 volts. In one embodiment, such difference of potential is from about 1,000 to about 10,000 volts. Such a difference of potential causes a current to flow between base 803 and substrate 804 that, in one embodiment, is at least about 10 milliamperes.

The following examples are presented to illustrate the claimed invention but are not to be deemed limitative thereof. Unless otherwise specified, all parts are by weight and all temperatures are in degrees Centigrade.

EXAMPLE 1

A diamond deposition system was built using the following equipment and methods: A set of two Uniweld Products "All Trades II" V style Oxyacetylene outfits were employed, each of which consisted of a pair of hoses, an oxygen regulator, an acetylene regulator, a torch handle with internal gas mixing, and a set of welding tips ranging in size from 0 to 10; also utilized were four Aera FC-980 mass flow controllers, four DP 455C digital panel meters, four 3610C control potentiometers, and an Aera AS-60A water vapor delivery system, a copper block 6"×6"×1" with an internal channel and a threaded input and output fitting for water-cooling, an Omega products SAT-12 platinum-rhodium 30 AWG thermocouple (ANSI type S) with an $Al_2O_3$ ceramic protection tube, a Keithley Instruments Model 2182 Nanovoltmeter, and a Keithley Instruments Model 248 High voltage power supply.

The Uniweld torch handle/mixer was attached to a tabletop clamp arm so that the welding tip was positioned above the copper block and but pointing away from it. The welding tip used was the No. 0 tip with an orifice diameter of approximately 0.6-mm. The two hoses, one for oxygen and one for acetylene were attached to torch handle/mixer. The other end of each hose was attached via an adapter to the output side of an Aera FC-980 mass flow controller. Each mass flow controller was connected to a corresponding DP 455C digital panel meter and 3610C Control Potentiometer. The input side of one mass flow controller was connected to the regulator of an ACP400 Grade 2.6, 99.6% pure container of acetylene from National Welders Supply. The input side of the other mass flow controller was connected to the regulator of an Ultra High Purity Grade 4.4, 99.994% pure container of oxygen also from National Welders Supply. The input line of the copper block was attached to a tap water supply and the output was connected to a drain. The copper block itself had been modified on its face with a long groove through the center $\frac{1}{8}^{th}$ of an inch wide and $\frac{1}{8}^{th}$ of an inch deep and 6" long. The thermocouple probe was placed in this groove so that its probe end was in the center of the block and the surface of the probe was flush with the surface of the block. A 2-cm by 2-cm piece of a silicon wafer was clamped to the center of the block using standard steel clamps. Prior to this, the silicon sample had been cleaned in and ultrasonic bath containing ethanol and then polished with Harris Diamond 1–10 micron grit powder.

To produce diamond, the valves of the torch handle were opened completely and the mass flow controllers were used as the means to control the flow of gas. After the tank regulators were opened, the 3610C control potentiometers were adjusted each to a flow rate of 1750 sccm per minute. The acetylene flame was then ignited. At this time the tap water source was opened. The flame was allowed to burn for 10 minutes in order for the gas mixture in the supply tanks to have time to stabilize. At this point the flame was observed to be neutral, i.e., having no acetylene-induced flame feather. The control potentiometer for the acetylene source was adjusted until the flame feather reached a length of approximately two centimeters. At this point the flow rate of acetylene was 1850 sccm, which gave a molar mass equivalency ratio between Carbon to Oxygen of 1.056. The tabletop clamp was then adjusted until the welding tip was pointing directly downward toward the copper block and the end of the flame feather was positioned approximately 2 millimeters from the silicon substrate. The tap water control was then adjusted until the temperature was stabilized at 900C according to the thermocouple probe. The oxy-acetylene torch was then allowed to operate for 30 minutes. After 30 minutes the gas flows were set to zero and the regulators closed.

After the oxy-acetylene torch was shut down, the silicon sample was allowed to cool for 30 minutes. The sample was then examined under a Carl Zeiss M2MAT Stereomicroscope. The examination revealed a bulls eye pattern approximately 6 millimeters in diameter consisting of the following: (a) a region of continuous diamond of randomly oriented size and shapes in the center of the bull's eye, with crystals approximately 1–10 microns in size extending from the center to about 3 millimeters from the center, (b) a region of dark balls mixed with small random crystals less than 1 micron, indicative of high graphitic carbon content extending from the previous region to about 4 millimeters from the center, and (c) a region of continuous randomly oriented diamond with octagonal shaped crystals on the outside edge, with crystals approximately 10–20 microns in size extending from the previous region to about 6 millimeters from the center.

EXAMPLE 2

In accordance with the procedure described for the experiment of Example 1, another experiment was performed using substantially the same conditions as Example 1 with the following conditions: (a) two welding tips from the Uniweld Products "All Trades II" V style Oxyacetylene torch set were connected to the original welding tip with a set of clamps, (b) these tips were placed parallel to the original, but on opposite sides so that they were 180 degrees apart with the original tip in the center, (c) the ends of the tip were recessed 1 mm from the end of the original tip, (d) the tips were size #6 with an opening diameter of approximately 2 millimeters, (e) the input sides of the tips were connected using brass tubing to two sides of a Y-connector, and the remaining end of the Y-connector was connected to the output port of a Uniweld Products torch handle with internal gas mixing, (f) one of the input ports of the torch handle/mixer was connected directly via a hose and adapter to an Aera FC-980 mass flow controller (g) this mass flow controller was then connected to the regulator of a bottle of Ultra High Purity Grade 5.0, 99.999% purity hydrogen from National Welders Supply, (h) the second input port of torch handle/mixer was connected via a hose and adapter to a T-connector, (i) one side of this T-connector was attached to an Aera FC-980 mass flow controller, (j) the input side of the other mass flow controller was connected to the regulator of another Ultra High Purity Grade 4.4, 99.994% pure container of oxygen also from National Welders Supply, and (k) the other side of the T-connector was connected to the output port of an Aera AS-60A water vapor delivery system. In total the system consisted of one nozzle burning oxygen and acetylene, and two adjacent nozzles burning oxygen and hydrogen with the addition of water vapor.

In order to produce diamond, substantially the same steps were used as described for the experiment of Example 1, with the following conditions being used: (a) after the torch had been properly positioned above the silicon sample with the flame feather 2 millimeters from the surface, and after the temperature was stabilized, the water vapor, oxygen and hydrogen sources were activated, (b) the control potentiometer was used to set the oxygen flow through the mass flow controller at 3500 sccm, (c) the control potentiometer was used to set the hydrogen flow through the mass flow controller at 3700 sccm, and the settings on the water vapor delivery system were adjusted to provide a flow of 400 sccm which is the equivalent of 5.56% mass of the total, (d) ignition of the mixture occurred upon contact with the existing oxy-acetylene flame, (e) the tap water flow into the cooling block was then readjusted to maintain the measured temperature at 900 C., (f) the oxy-acetylene torch was then allowed to operate for 30 minutes, and (g) after 30 minutes the gas flows were set to zero and the regulators closed.

After the oxy-acetylene torch was shut down, the silicon sample was allowed to cool for 30 minutes. The sample was the examined under a Carl Zeiss M2MAT Stereomicroscope. The examination revealed an hourglass pattern about 9 millimeters long with the following properties: (a) a region of continuous diamond of randomly oriented size and shapes in the center (narrow) region of the hourglass, with crystals approximately 1–10 microns in size, which center region corresponded to the point directly under the central oxy-acetylene torch tip, and (b) a region of continuous randomly oriented diamond extending from the narrow region of the hourglass to the to the broad regions of the top and bottom of the hourglass. These broad regions of the top and bottom of the hourglass corresponded to the areas directly under the oxy-hydrogen torch tips. The orientation of these crystals became more uniform and assumed more of an octagonal shape as they approached outside edge of the top and bottom of the hourglass pattern. The size of these crystals grew from 1–10 microns to approximately 15–20 microns in size as they approached outside edge of the top and bottom of the hourglass pattern.

A region of dark balls mixed with small random crystals less than 1 micron was present on each side of the hourglass pattern, starting about 1 millimeter from the center extending out about 4 millimeters from the center. The properties of this region appeared to be indistinguishable from those the graphitic carbon region described in Example 1, except for the extension of this region from the center as noted previously.

Also found were two regions of continuous randomly oriented diamond with octagonal shaped crystals on the outside edge, with crystals approximately 10–20 microns in size. Each region was oval shaped and abutted extending previous region extending outward for about 2 millimeters from the previous region. The properties of this region appeared to be indistinguishable from those the continuous randomly oriented diamond region on the outside of the bull's eye as described in Example 1, except for the extension and shape of this region as noted previously.

EXAMPLE 3

Another experiment was performed using substantially the same conditions as the experiment described in Example 1 with the following differences described below.

Three aluminum silicate ceramic pipes 3 inches long and ½ inch in diameter were obtained. The ends of these pipes were machined with a standard sized threading. The ends of these pipes were then fitted with stainless steel adapters and threads were sealed with an epoxy compound. These pipes were then connected between the welding torch tips and the torch handle/mixer. These pipes served to electrically insulate the torch tips form the remaining equipment and ground. The tabletop clamp arm was then readjusted so the position of torch tip was the same as that described in Example 1.

A Keithley Instruments Model 248 High voltage power supply was connected between the tip and the substrate. The positive terminal was connected to the torch tip by clamping a copper wire with the sheath removed from the last 8" to the input side of the tip. The negative terminal was electrically connected to the silicon sample by connecting it physically to the four steel clamps that hold the sample in place. The copper cooling block was placed on an insulating surface and the nylon water hose to the copper block provided electrical insulation. By this means the silicon sample was isolated from electrical ground.

To produce diamond the same steps were used as outlined in Example 1 with the following differences, described below.

After the torch had been properly positioned above the silicon sample with the flame feather 2 millimeters from the surface, and after the temperature was stabilized, the Model 248 high voltage power supply was activated. The voltage was increased and the current was monitored. At a voltage of 250V the ammeter on the power supply detected an initial current in the microamp range. At a voltage of 870V the ammeter on the power supply registered a current of about 1 milliamp. After this point the current began to rise rapidly. At a voltage of 1340V the ammeter on the power supply registered a current of about 50 milliamps. No change was detected in the temperature of the substrate as measured by the thermocouple. The oxy-acetylene torch was then allowed to operate for 30 minutes. After 30 minutes the gas flows were set to zero, the regulators closed, and the power supply was shut off. After the oxy-acetylene torch was shut down, silicon sample was allowed to cool for 30 minutes.

A sample prepared under the conditions given in Example 1 and a sample prepared under the conditions given in Example 3 were both scribed on the back sides using a straight edge and a diamond tipped scribe. The scribe mark was place to run directly through the center of the diamond deposit on each sample. The samples were then snapped in half along the scribe mark and through the deposited diamond. The samples were then the examined under a Carl Zeiss M2MAT Stereomicroscope under high magnification. Using a 50-micron wide gold wire as a size reference, the thickness of the diamond deposit in the center of the sample was estimated. The sample prepared under the conditions given in Example 1 had a thickness of approximately 250 microns at its thickest point. Using the same measurement conditions the sample prepared under the conditions given in Example 1 had a thickness of approximately 550 microns at its thickest point.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention.

I claim:

1. A process of producing a diamond substance with a first inner nozzle and a second outer nozzle, comprising the steps of:
  (a) forming a first mixture comprised of oxygen gas and a hydrocarbon gas within said first inner nozzle, wherein:
    1. such hydrocarbon gas contains from about 1.01 to about 1.1 moles of carbon for each mole of oxygen present in such first mixture, and
    2. said first mixture contains at least about 10 volume percent of hydrocarbon gas,
  (b) igniting said first mixture to produce a flame core;
  (c) forming a second mixture comprised of hydrogen and oxygen in said outer nozzle, wherein:
    1. said second mixture is comprised of at least 2 moles of said hydrogen for each mole of said oxygen present in the second mixture,
    2. hydrogen gas and oxygen gas comprise at least about 20 volume percent of said second mixture,
    3. said second mixture contains up to about 5 volume percent of hydrocarbon gas;
  (d) igniting said second mixture to produce a flame sheath;
  (e) disposing said flame sheath around said flame core so that said flame sheath completely surrounds said flame core and completely shields said flame core from the ambient atmosphere, thereby producing a composite flame; and
  (f) contacting said composite flame with a substrate.

2. The process as recited in claim 1, wherein said hydrocarbon gas has a heat of formation of at least about 20 kilocarlories/gram-mole.

3. The process as recited in claim 2 wherein, when said hydrocarbon gas is combusted with at least an equimolar amount of oxygen, a flame is formed with a temperature of at least about 2,000 degrees Centigrade.

4. The process as recited in claim 3, wherein said hydrocarbon gas is Brown's gas.

5. The process as recited in claim 4, wherein said flame sheath is contiguous with said flame core.

6. The process as recited in claim 1, wherein said flame sheath has a temperature of at least about 250 degrees Centigrade.

7. The process as recited in claim 1, wherein said flame sheath has a temperature of from about 450 to about 650 degrees Centigrade.

8. The process as recited in claim 1, wherein said second mixture is comprised of at least about 50 volume percent of said hydrogen gas and said oxygen gas.

9. The process as recited in claim 8, wherein said second mixture is comprised of water vapor.

10. The process as recited in claim 9, wherein said second mixture comprises up to about 50 volume percent of said water vapor.

11. The process as recited in claim 8, wherein said second mixture is comprised of inert gas.

12. The process as recited in claim 11, wherein said second mixture comprises less than about 20 volume percent of said inert gas.

13. The process as recited in claim 8, wherein said second mixture if comprised of hydrogen peroxide.

14. The process as recited in claim 8, wherein said second mixture is comprised of ozone.

15. The process as recited in claim 1, further comprising reacting graphite with hydroxyl ion.

16. The process as recited in claim 15, further comprising reacting graphite with oxygen ion.

17. A process of producing a diamond substance with a first inner nozzle and a second outer nozzle, comprising the steps of:

(a) forming a first mixture comprised of oxygen gas and a hydrocarbon gas within said first inner nozzle, wherein:
　1. such hydrocarbon gas contains from about 1.01 to about 1.1 moles of carbon for each mole of oxygen present in such first mixture, and
　2. said first mixture contains at least about 10 volume percent of hydrocarbon gas,
(b) igniting said first mixture to produce a flame core;
(c) forming a second mixture comprised of hydrogen and oxygen in said outer nozzle, wherein:
　1. said second mixture is comprised of at least 2 moles of said hydrogen for each mole of said oxygen present in the second mixture,
　2. hydrogen gas and oxygen gas comprise at least about 20 volume percent of said second mixture,
　3. said second mixture contains up to about 5 volume percent of hydrocarbon gas;
(d) igniting said second mixture to produce a flame sheath;
(e) disposing said flame sheath around said flame core so that said flame sheath completely surrounds said flame core and completely shields said flame core from the ambient atmosphere, thereby producing a composite flame;
(f) establishing a difference of potential between said composite flame and a substrate of at least about 250 volts,
(g) causing a current flow between said composite flame and said substrate of at least about 10 milliamperes, and
(h) contacting said composite flame with a substrate.

18. The process as recited in claim 17, wherein said difference of potential is at least about 1,000 volts.

19. The process as recited in claim 18, wherein said difference of potential is from about 1,000 to about 10,000 volts.

20. The process as recited in claim 18, wherein said current flow is uniformly distributed within said composite flame.

* * * * *